June 26, 1951  L. DINESEN  2,558,346
MILKER SUPPORT
Filed Feb. 24, 1948  2 Sheets-Sheet 1
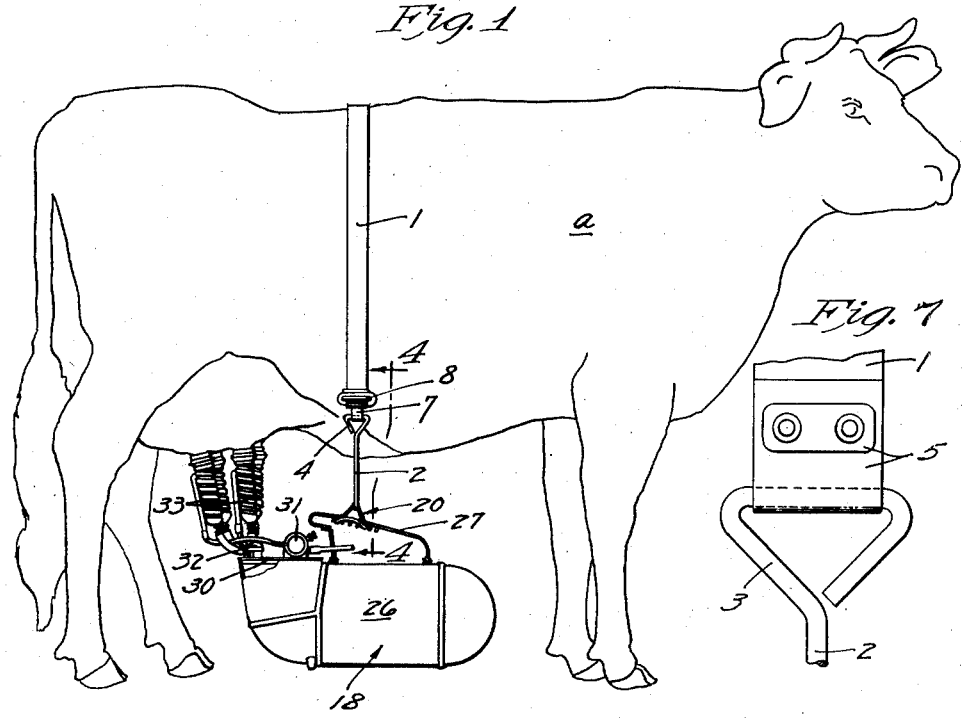
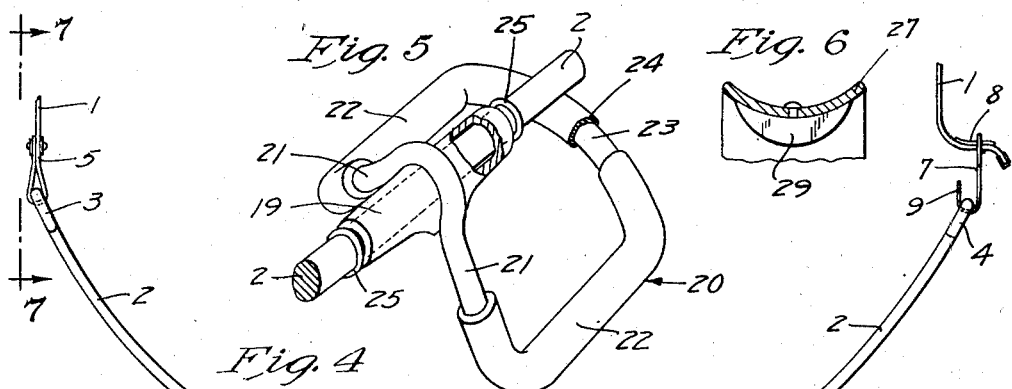
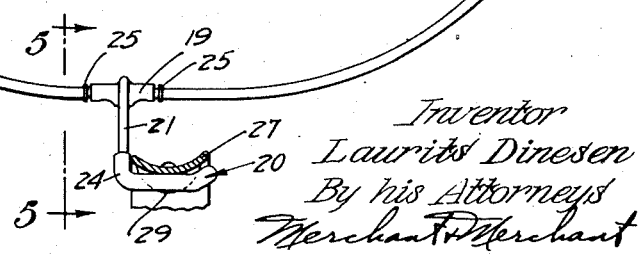
Inventor
Laurits Dinesen
By his Attorneys
Merchant & Merchant June 26, 1951 L. DINESEN 2,558,346
MILKER SUPPORT
Filed Feb. 24, 1948 2 Sheets-Sheet 2
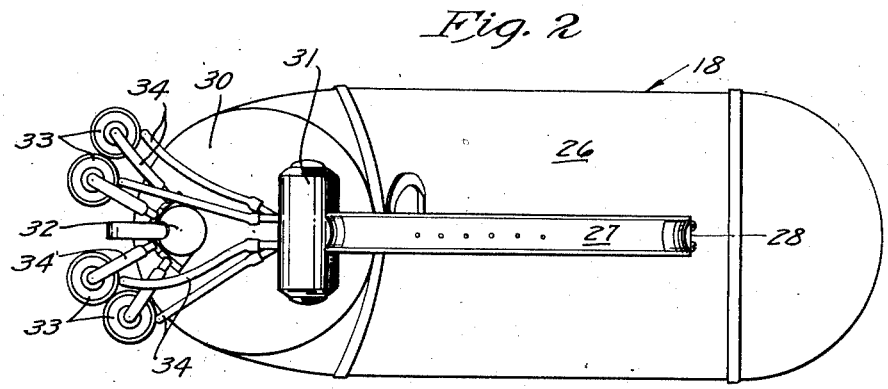
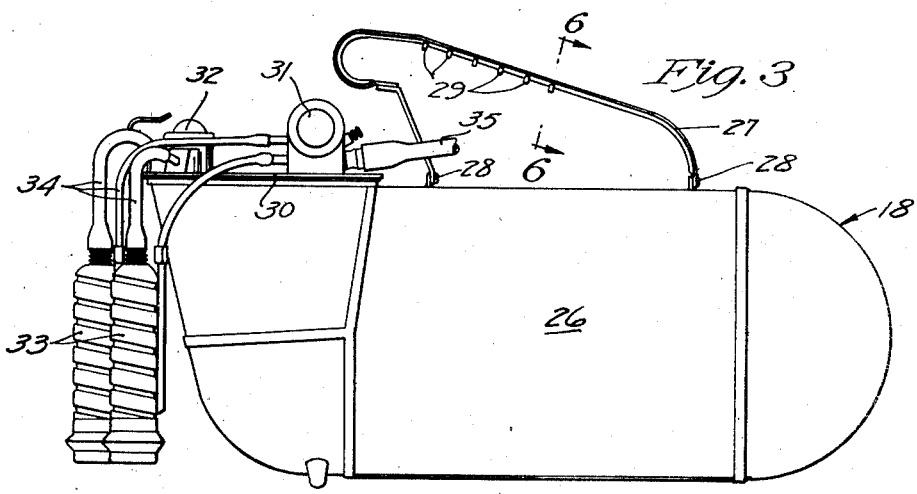
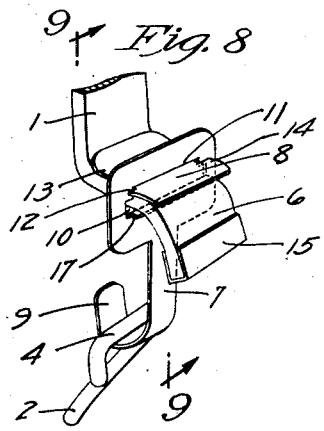 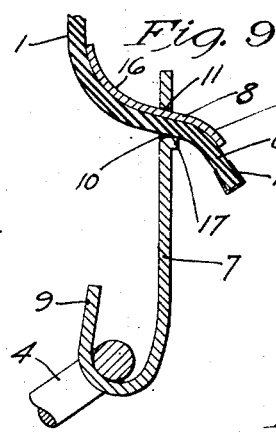 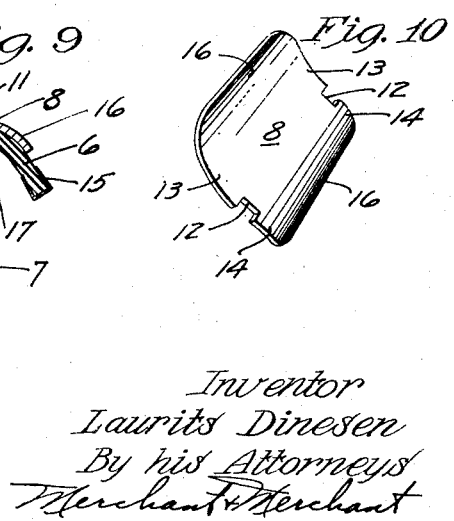
Inventor
Laurits Dinesen
By his Attorneys
Merchant & Merchant Patented June 26, 1951

2,558,346

UNITED STATES PATENT OFFICE 2,558,346

MILKER SUPPORT

Laurits Dinesen, Minneapolis, Minn., assignor to Perfection Manufacturing Corporation, Minneapolis, Minn., a corporation of Minnesota Application February 24, 1948, Serial No. 10,533

3 Claims. (Cl. 24—163)

My invention relates to mechanical milkers and, more particularly, to improvements in adjustable means for suspending or supporting the same in milking position beneath the cow.

An important object of my invention is the provision of a novel structure of the type above described which will maintain the milk pail and mechanism associated therewith substantially free from swinging movements laterally of the cow, but which will permit free pivotal movements of the pail in a vertical plane extending longitudinally of the cow.

Another object of my invention is the provision of a novel milk pail and means for suspending the same which will result in an increased pull on the teats of the cow as the height of the milk level within the pail increases.

Another important object of my invention is the provision of a novel adjustable buckle between the surcingle strap and the hanger bar, which will facilitate adjustment to animals of different sizes and physical characteristics.

The above and still further objects of my invention will become apparent from the following detailed specification, appended claims, and attached drawings.

Referring to the drawings, wherein like characters indicate like parts throughout the several views:

Fig. 1 is a side elevational view of a milker support embodying my invention in place on a cow and carrying a suspended milker;

Fig. 2 is a plan of the milking pail and associated parts of my invention;

Fig. 3 is a view in side elevation of the parts shown in Fig. 2;

Fig. 4 is an enlarged fragmentary view, partly in front elevation and partly in section, taken substantially on the line 4—4 of Fig. 1;

Fig. 5 is a still further enlarged fragmentary perspective view with some parts being broken away and others shown in section, taken substantially on the line 5—5 of Fig. 4;

Fig. 6 is a fragmentary cross-sectional detail, taken on the line 6—6 of Fig. 3;

Fig. 7 is an enlarged fragmentary view in side elevation, as seen from the line 7—7 of Fig. 4;

Fig. 8 is a fragmentary view in perspective on an enlarged scale, illustrating the buckle means for adjusting the surcingle;

Fig. 9 is a fragmentary view in section on a still further enlarged scale, taken substantially on the line 9—9 of Fig. 8; and Fig. 10 is a perspective view of a tongue comprising a portion of the buckle means of Figs. 8 and 9.

Referring with greater particularity to the drawings, the numeral 1 indicates a flexible strap adapted to extend over the back of a cow with its free ends depending from opposite sides thereof. The numeral 2 indicates a rigid hanger bar, preferably formed from a steel rod or the like, having its opposite ends bent in the form of loops 3 and 4. The looped end 3 is pivotally secured to one end of the strap 1, as indicated at 5. The hanger bar 2 is arcuate in form and is of a length at least equal to the lateral thickness of the belly portion of a cow. The looped end 4 of the hanger bar 2 is removably anchored to the free end 6 of the strap 1 by means of a fixture comprising a rigid main body 7 and a rigid tongue 8. At its lower end, the main body 7 is curved to form an upwardly-opening hook 9 which receives and supports the looped end 4 of the hanger bar 2. The upper end portion of the main body 7 is pierced to form an aperture 10 which, adjacent its bottom edge, is of a size to allow passage therethrough of the free end 6 of the strap 1. It will be noted that the aperture 10, at its upper edge, is reduced or restricted to provide a notch 11. The tongue 8, at its opposite sides, is provided with a pair of aligned notches 12 which are defined by laterally-extended side portions 13 and 14.

It will be observed that the tongue 8 is of a thickness to correspond approximately to the height of the reduced portion 11 of the aperture 10, whereas the strap 1 is of a thickness approximating the height of the unreduced portion of the aperture 10. Furthermore, it will be seen that the width of the tongue 8, between the portions 13 and 14, is slightly less than the width of the enlarged or unrestricted lower portion of the aperture 10, whereas the width of said tongue 8, intermediate the aligned notches 12, is only slightly less than the width of the restricted upper portion 11 of the aperture 10. This novel arrangement permits insertion of the tongue 8 into the aperture 10 by first inserting either of the enlarged ends 13 and 14 through the lower portion of the aperture 10 and then elevating the same into the reduced portion 11, as shown particularly in Fig. 8, wherein the notches 12 engage the sides of the reduced portion 11 of the aperture 10 and wherein the extended portions 13 and 14 limit longitudinal movements of the tongue 8 within the aperture. Thereafter, and when the free end 6 of the strap 1 is inserted through the enlarged bottom portion of the aperture 10, it becomes impossible to remove the tongue 8 from its position overlying the strap 1. An end cap 15 may be applied to the free end 6 of the strap 1 after its insertion in the aperture 10 to prevent its being withdrawn therethrough. To prevent unnecessary binding of the strap 1, the opposite ends of the tongue 8 are curved in opposite directions, as indicated at 16.

As shown, particularly by reference to Figs. 8 and 9, the main body 7 of the fixture immediately underlying the aperture 10 is provided with an outwardly-projecting gripping lip or flange 17 which preferably extends across the entire width of the enlarged portion of the aperture 10 in the direction of the free end 6 of the strap 1.

When it is desired to suspend a milking machine or the like, such as indicated in its entirety by the numeral 18 in Fig. 1, the flexible strap 1 is first positioned over the back of a cow, indicated by the letter a, so that the free ends thereof are positioned on either side of the cow approximately at udder height, as shown by Fig. 1. The hanger bar 2 is then passed under the belly of the cow and the looped end 4 thereof dropped into the open-ended hook 9 of the main body 7. It will be noted that the strap 1 is of a length to allow the hanger bar 2 to underlie the belly of the cow in spaced relation thereto. It will be also noted that the length of the hanger bar is such that there will be little or no squeezing action on the belly of the cow as the weight of the milker 18 is applied thereto. Thereafter and in order to adjust this novel weight-carrying mechanism to the particular size and characteristics of a given cow, it is but necessary to relieve the tension between the belt 1 and the main body and move the belt 1 through the aperture 10 to the desired position. Such a position will be maintained by putting any load upon the hanger bar 2. Such load upon the hanger bar 2, or the weight of the hanger bar itself, will tend to straighten the strap 1 and cause a resultant rocking action of the tongue 8, whereby to cause that end adjacent the side portions 14 of the tongue 8 to force the belt 1 against the gripping lip 17 and lock the strap 1 in the desired position.

To the intermediate portion of the hanger bar 2 is pivotally secured, through the medium of a bearing sleeve 19, a laterally-opening hook element 20 which, as shown, is formed from a relatively heavy metallic rod and comprises a depending yoke 21 rigidly secured to the bearing sleeve 19 and a pair of spaced laterally-extending supporting fingers 22, which form a wide base of support and which are connected at their outer ends by an upwardly-bowed connecting member 23. The laterally-extending fingers 22 and the connecting member 23, as shown, may be covered with a relatively soft material, such as rubber tubing or the like 24.

It will be noted that, when the hanger bar is depending from the cow a, the hook element 20 is free for pivotal movements on an axis transversely of the cow a. Axial movements of the hook element 20 on the hanger bar 2 are limited by stop means in the nature of collars or the like 25.

The milk machine 18, preferably utilized with the above-described novel arrangement, comprises an elongated pail 26, preferably of a width to allow the cow to kick past the sides thereof without striking the same. The pail 26 is provided at its intermediate portion with a longitudinally-extended handle element 27 hinged or otherwise secured thereto, as indicated at 28, and which preferably inclines upwardly and rearwardly. The under portion of the handle, preferably and as shown, is provided with a plurality of longitudinally-spaced notches formed by teeth 29. Adjacent its rear end, the milk pail 26 is preferably provided with a removable cover 30 to which is secured the customary or conventional pulsator 31, milk flow indicator 32, and a plurality of teat cups 33. Teat cups 33 are connected to the cover by means of flexible rubber tubing 34. A vacuum tube 35 is connected at one end to the pulsator 31 and at its opposite end to a source of partial vacuum, not shown. Furthermore, and as shown, the rear end of the milk pail projects upwardly and rearwardly for a purpose which will hereinafter become apparent.

The milking machine 18 is inserted laterally onto the hook element 20 so that the supporting fingers 22 thereof come to rest against the desired teeth 29, specifically as shown in Fig. 1. In this position and after the teat cups 33 have been applied to the teats of the cow, as shown in Fig. 1, the milking machine 18 is permitted rocking movements in a vertical plane longitudinally of the cow, but is prevented from swinging or twisting movements laterally of the cow. Whereas lateral rocking movements are undesirable, rocking movements in a vertical plane longitudinally of the cow are important to allow tilting of the milk pail 26 so as to increase the pull on the teats of the cow as the milk level in the pail increases and the milking operation nears completion. To further assure such action, I initially hang the milk pail 26 on the hook element 20 in an approximately balanced position. Thereafter, and as the fluid level in the pail 26 increases, the rear end of the pail will tend to drop down, due to the increasingly greater weight of the fluid in the rear end thereof, thus causing an ever-increasing pull on the teats.

While I have described a commercial embodiment of my invention, it should be obvious that the same is capable of change and modification without departure from the scope and spirit of the invention as defined by the appended claims.

What I claim is:

1. In a device of the class described, a flexible strap, a hanger bar secured at one end to one end of said strap, and a fixture for adjustably connecting the free end of said strap to the free end of said hanger bar, said fixture comprising a rigid main body having a hook at one end to receive the free end of said hanger bar and a transversely-extended aperture adjacent its opposite end adapted to slidably receive the free end of said strap, one surface of said strap frictionally engaging one side of said aperture, the opposite side of said aperture being provided with a reduced notch, a rigid tongue extending transversely through said aperture and snugly receivable within said notch for limited rocking movements and frictionally engaging the opposite side of said belt, and means on said tongue for locking same against lateral and longitudinal movements in said notch.

2. The structure defined in claim 1 in which the strap-engaging portion of the body adjacent the aperture is laterally offset in the direction of the free end of the strap whereby to provide a gripping lip against which the strap is forced by rocking action of said tongue when load is applied to the strap.

3. In a device of the class described, a flexible strap, a hanger bar secured at one end to one end of said strap, and a fixture for adjustably connecting the free end of said strap to the free end of said hanger bar, said fixture comprising a vertically-disposed rigid main body having a hook at its lower end to receive the free end of said hanger bar, and a transversely-extended aperture adjacent its upper end adapted to receive the free end of said strap, the lower surface of said aperture frictionally engaging one side of said belt, said aperture being provided with a reduced central downwardly-opening notch, and a plate-like rigid tongue extending transversely through said aperture and snugly receivable within said notch for limiting rocking movements and frictionally engaging the opposite side of said belt, said belt being retained within said notch by engagement with said belt and being provided with means for preventing lateral and longitudinal movements thereof within said notch.

LAURITS DINESEN.

REFERENCES CITED

The following references are of record in the file of this patent:

UNITED STATES PATENTS

| Number | Name | Date |
|---|---|---|
| 460,746 | Ellsworth | Oct. 6, 1891 |
| 544,813 | De Laval | Aug. 20, 1895 |
| 713,625 | Foote | Nov. 18, 1902 |
| 817,686 | Ames | Apr. 10, 1906 |
| 878,058 | Groff | Feb. 4, 1908 |
| 1,548,023 | Cowell | Aug. 4, 1925 |
| 2,340,297 | Schmitt et al. | Feb. 1, 1944 |
| 2,412,197 | Babson | Dec. 10, 1946 |
| 2,460,856 | Stanke et al. | Feb. 8, 1949 |

FOREIGN PATENTS

| Number | Country | Date |
|---|---|---|
| 560,878 | France | July 23, 1923 |